Patented Aug. 21, 1951

2,565,107

UNITED STATES PATENT OFFICE 2,565,107

METHOD OF PRODUCING POROUS AGGREGATE MIXES

Vilas E. Watts, Los Altos, Calif., assignor to Zonolite Company, Chicago, Ill., a corporation of Montana No Drawing. Application October 11, 1948, Serial No. 53,990

9 Claims. (Cl. 106—122)

This invention relates to a method for producing porous aggregate mixes. More particularly, it relates to a method of producing mixes of porous aggregates such as expanded vermiculite, and thermoplastic materials such as asphalt, characterized by minimum penetration of the aggregate particles by the thermoplastic material.

For certain purposes, such as insulation, light weight, porous aggregates, such as expanded vermiculite, haydite, pumice, perlite, scoria, etc., are employed in lieu of denser aggregates such as sand and gravel, and a thermoplastic binder, such as asphalt, coal tar or a thermoplastic synthetic resin, is employed to coat the particles of aggregate and bind them together.

Since, for these purposes, it is desirable to maintain the aggregate particles as nearly as possible in their original, porous state in the final mix and finished product, it is desirable to prevent as much as possible penetration of the pores of the aggregate by the thermoplastic material.

It has been proposed heretofore to accomplish this object by careful, delicate control over the mixing operation, as by carefully adjusting the proportions of thermoplastic material and aggregate and the rate of admixture of thermoplastic material to the aggregate. Such means, however, are difficult from an operational standpoint and frequently yield a product which is undesirable.

It is an object of the present invention to provide an improved method of mixing thermoplastic materials with porous aggregates.

It is a further object of the invention to provide a method of mixing porous aggregates, such as expanded vermiculite, pumice, perlite, haydite and scoria, with a hot fluid thermoplastic material such as asphalt, coal tar and thermoplastic synthetic resins, such method being operable to obtain an intimate mixture of the thermoplastic material and aggregate in a minimum of time but with substantially no penetration of the pores of the aggregate by the thermoplastic material.

It is a still further object of the invention to provide a method of mixing aggregates and thermoplastic materials of the character described, which is operable to obtain an intimate mixture of the materials and at the same time prevent penetration of the pores of the aggregate by the thermoplastic material, such method being simple and straightforward to carry out and dependable to yield a superior product.

It is a still further object of the invention to provide a method for producing an improved aggregate, thermoplastic mix of the character described, characterized by little or no penetration of the pores of the aggregate by the thermoplastic material.

These and other objects of the invention will be apparent from the ensuing description and the appended claims.

I have discovered that porous aggregates of the character described can be intimately and rapidly intermixed with a hot fluid thermoplastic material of the character described to yield a product of superior quality, characterized by little or no penetration of the pores by the thermoplastic material, such method comprising the admixture of a small amount of water or other suitable volatile liquid to the aggregate prior to or during, preferably prior to, addition of the thermoplastic material to the aggregate.

By way of illustration of the practical application of this method, the following specific example is provided:

Example 500 grams of expanded vermiculite passing a #3 sieve and retained on a #10 sieve was dampened with 50 c. c. of 1% solution of ferric chloride in water. (The ferric chloride was used to promote adhesion of the asphalt to the aggregate.) This dampened aggregate was then mixed into 500 grams of molten air-blown asphalt (160° F. melting point) the temperature of which was 500° F. After one minute of mixing in a mechanical paddle mixer during which steam was released the aggregate was completely and uniformly coated and the temperature of the mixture had been reduced to 180° F. by the moisture evaporation. The resultant mixture was molded into a 1" layer between two sheets of 15# asphalt impregnated roofing felt and lightly compressed. It set up firmly into a light weight insulating structure very suitable for use as insulating plank such as could be used like cork board.

Another mixture was made by the identical method described in the above example, using the same ingredients and in the same quantities but without the addition of the aqueous solution. The resultant product was distinctly inferior, inasmuch as the surface of the aggregate particles retained insufficient asphalt for the latter to have any binding action. Upon examination, it was found that the coating material was almost wholly absorbed by the pores of the aggregate.

Examples of aggregates which may be treated by the procedure of this invention are expanded vermiculite, pumice, perlite, scoria, haydite and any other aggregate of porous character. Examples of thermoplastic materials which may be used are asphalts, both of natural and petroleum origin, and steam refined as well as air blown, coal tars, coal tar pitches, and natural and synthetic thermoplastic resins such as the vinyl resins. Examples of volatile liquids are water, alcohol and any other liquid boiling within the range of the thermoplastic material as employed in the mixing process and immiscible therewith.

The proportions and manner of mixing the aggregate and thermoplastic material are well known and require no elaboration here. Thus, the thermoplastic material may be used in an amount sufficient only to barely coat the particles of aggregate so as to water-proof the same without acting as a binder therefor, or it may be used in considerably larger amounts, e. g., equal parts by weight of thermoplastic material and aggregate.

With regard to the proportion of volatile liquid used, the same may vary within wide limits, depending upon the type of aggregate used, the type of thermoplastic material used, the proportions in which the aggregate or thermoplastic material are employed, and other factors. I have found that the volatile liquid has two separate effects. One effect is the creation of dispersed vapor within the binder in a quantity sufficient to form a froth, such froth acting to promote the intermixing of the thermoplastic material and aggregate and to cause more effective and complete intermixture of these two ingredients. If it is desired to use only enough volatile liquid to produce such frothing, then only a very small amount, on the order of 0.1% by weight based on the weight of aggregate, need be employed, such amount being sufficient to produce violent frothing.

The other effect of the volatile liquid is to cool the thermoplastic material down to the finishing temperature. Thus, it is generally the practice to mix a cold aggregate with hot asphalt or other hot, fluid thermoplastic material, the thermoplastic material being at a temperature considerably above the finishing temperature. The finishing temperature is the minimum temperature at which the thermoplastic material and the aggregate can be efficiently mixed, and below which the mixture becomes too stiff for ease of mixing, molding or otherwise working it into a finished product. It is desirable to bring the temperature of the molten thermoplastic material down to the finishing temperature as rapidly as possible, inasmuch as the more highly heated, hence more fluid, thermoplastic material tends to penetrate the pores of the aggregate rapidly. It is, therefore, apparent that the higher the temperature of the thermoplastic material at the commencement of mixing, or the lower the specific heat of the aggregate, the more coolant will be needed. If, on the other hand, conditions such as the proportion of aggregate to thermoplastic material, the specific heat of the aggregate or the initial temperature of the thermoplastic material, are such that the aggregate alone will rapidly cool the thermoplastic material to the finishing temperature, only the minimum amount of water necessary to produce a froth need be used.

The preferred manner of adding the water or other volatile liquid is to start with a body of aggregate in a mixer, add the water in the calculated amount to the aggregate while it is being agitated in the mixer, and then add the molten thermoplastic material to the water-aggregate mixture.

It will thus be seen that a very simple and expeditious method has been provided for mixing porous aggregates with thermoplastic material which minimizes the penetration of the pores of the aggregate by the thermoplastic material and which promotes efficient mixture of the principal ingredients.

While I have shown the preferred form of my invention, it is to be understood that various changes may be made in its application by those skilled in the art without departing from the spirit of the invention as defined in the appended claims.

Having thus described my invention, what I claim and desire to secure by Letters Patent is:

1. A method for mixing thermoplastic binding materials with light-weight, porous, inorganic aggregate to bind together the discrete particles of said aggregate while maintaining the open pores thereof effective to impart insulating properties to the finished product comprising: providing a mass of said aggregate and a separate mass of hot, molten, water-insoluble, organic, thermoplastic binder capable of setting, on cooling, to a substantially solid state to adhere to the surfaces of the discrete particles of aggregate and bind them together; adding to said aggregate a small amount of water; mixing said aggregate to which said water has been previously added with said molten binder while the latter is at a temperature sufficiently high to convert the added water to steam and produce a frothing of the binder; said binder being in sufficient quantity that when mixed with the aggregate it coats the particles of aggregate and binds them together; the amount of water added to said porous aggregate being not less than 0.1% by weight of the aggregate and being sufficient to rapidly cool the binder to a temperature such that the binder has a nonpenetrating viscosity, said cooling being effected by conversion of the water to steam by the heat of the binder.

2. The method of claim 1 wherein said binder is a bituminous binder.

3. The method of claim 1 wherein said binder is asphalt.

4. The method of claim 1 wherein said binder is an air-blown asphalt.

5. The method of claim 1 wherein said binder is coal tar.

6. The method of claim 1 wherein said aggregate is expanded vermiculite.

7. The method of claim 1 wherein said aggregate is expanded perlite.

8. The method of claim 1 wherein said aggregate is expanded vermiculite and said binder is asphalt.

9. The method of claim 1 wherein said aggregate is expanded perlite and said binder is asphalt.

VILAS E. WATTS.

REFERENCES CITED

The following references are of record in the file of this patent:

UNITED STATES PATENTS

| Number | Name | Date |
|---|---|---|
| 1,343,680 | Pine | June 15, 1920 |
| 1,972,390 | Miner | Sept. 4, 1934 |
| 2,036,913 | Brown | Apr. 7, 1936 |
| 2,077,094 | Byers | Apr. 13, 1937 |
| 2,079,664 | Seigle | May 11, 1937 |
| 2,289,250 | Denning | July 7, 1942 |
| 2,291,616 | Fletcher | Aug. 4, 1942 |
| 2,443,222 | Bergstein | June 15, 1948 |